United States Patent
Orr et al.

(10) Patent No.: US 10,360,652 B2
(45) Date of Patent: Jul. 23, 2019

(54) WAVEFRONT RESOURCE VIRTUALIZATION

(71) Applicant: Advanced Micro Devices, Inc., Sunnyvale, CA (US)

(72) Inventors: Marc S. Orr, Renton, WA (US); Bradford M. Beckmann, Redmond, WA (US); Benedict R. Gaster, Santa Cruz, CA (US); Steven K. Reinhardt, Vancouver, WA (US); David A. Wood, Madison, WI (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 171 days.

(21) Appl. No.: 14/304,483

(22) Filed: Jun. 13, 2014

(65) Prior Publication Data
US 2015/0363903 A1    Dec. 17, 2015

(51) Int. Cl.
*G06T 1/20* (2006.01)
(52) U.S. Cl.
CPC .................... *G06T 1/20* (2013.01)
(58) Field of Classification Search
CPC .......... G02F 7/00; G06F 17/3033; G06T 1/20
USPC ....................... 345/522, 501, 530
See application file for complete search history.

(56) References Cited

U.S. PATENT DOCUMENTS

| | | | |
|---|---|---|---|
| 2004/0031026 A1* | 2/2004 | Srinivasan | G06F 8/452 717/161 |
| 2009/0309876 A1* | 12/2009 | Dorbie | G06T 17/20 345/423 |
| 2012/0017062 A1* | 1/2012 | Goel | G06F 9/3851 711/170 |
| 2012/0151145 A1* | 6/2012 | Lyashevsky | G06F 9/3834 711/125 |
| 2012/0188259 A1* | 7/2012 | Hartog | G06T 1/20 345/503 |
| 2012/0192201 A1* | 7/2012 | Sander | G06T 1/20 718/105 |
| 2013/0145202 A1* | 6/2013 | Hartog | G06F 12/1081 714/2 |
| 2013/0160019 A1* | 6/2013 | Hartog | G06F 9/4843 718/104 |
| 2013/0262834 A1* | 10/2013 | Lefebvre | G06F 9/30 712/220 |

* cited by examiner

*Primary Examiner* — Ke Xiao
*Assistant Examiner* — Kim Thanh T Tran
(74) *Attorney, Agent, or Firm* — Volpe and Koenig, P.C.

(57) ABSTRACT

A processor comprising hardware logic configured to execute of a first wavefront in a hardware resource and stop execution of the first wavefront before the first wavefront completes. The processor schedules a second wavefront for execution in the hardware resource.

15 Claims, 7 Drawing Sheets

WAVEFRONT RESOURCE VIRTUALIZATION

BACKGROUND

Field

Embodiments relate, generally, to resource virtualization in processors and, more specifically, to wavefront virtualization for general purpose computing in graphics processing units.

Background

While chip designers originally created graphics processing units (GPUs) for the rapid rendering of images for display, software developers have been increasingly trying to use GPUs for general-purpose computing. However, because GPUs are designed to handle large amounts of data simultaneously, executing general-purpose code on a GPU can prove challenging.

One of the disadvantages of using GPUs for general-purpose computing is their lack of scheduling flexibility. Certain computing tasks may need constant task scheduling in order to execute efficiently. For example, a work producer task can schedule work for a consumer task by writing the work into a buffer. If too many producer tasks are scheduled, the space in the buffer can run out. When this happens, consumer tasks should be scheduled more often to free up space in the buffer and the producer tasks can complete. Another example of tasks needing scheduling flexibility may be when a number of tasks exceeding the hardware resources available try to implement a global barrier. In this scenario, some tasks must relinquish the hardware so that others can be scheduled to run and arrive at the barrier.

BRIEF SUMMARY OF CERTAIN EMBODIMENTS

It would be advantageous to provide improved hardware resources for performing efficient work scheduling in GPUs.

A processor, method and computer-readable storage media configured to yield resources in use by a wavefront are provided. The processor comprises hardware logic configured to execute a first wavefront in a hardware resource and stop execution of the first wavefront before the first wavefront completes. The processor schedules a second wavefront for execution in the hardware resource.

Further features and advantages of the embodiments, as well as the structure and operation of various embodiments, are described in detail below with reference to the accompanying drawings. It is noted that the embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the embodiments and, together with the description, further serve to explain the principles of the embodiments and to enable a person skilled in the relevant art(s) to make and use the embodiments.

Figure 1:
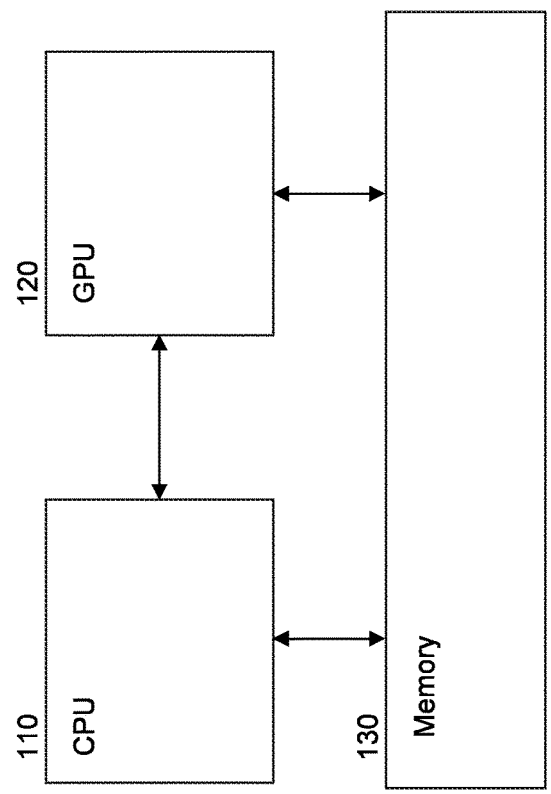
FIG. 1 is a block diagram of an illustrative computer processor operating environment, according to an embodiment.

The features and advantages of the embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 is a block diagram of an illustrative computer processor operating environment 100, according to an embodiment. In one example, operating environment 100 includes a central processing unit (CPU) 110, a graphics processing unit (CPU) 120 and a memory unit 130.

CPU 110 can be any processor designed for general purpose computing. In an embodiment, CPU 110 implements an x86 instruction set architecture (ISA). Other ISA could also be employed.

GPU 120 can be any processor designed for graphics processing. In an embodiment, GPU 120 implements a "single instruction, multiple data" (SIMD) architecture.

CPU 110 and GPU 120 can communicate instructions and data between each other. In an embodiment, CPU 110 and GPU 120 form part of a single chip. CPU 110 and GPU 120 contain logic circuits and memory configured to carry out computer program instructions by performing arithmetical, logical and input/output operations, as described below by way of example.

Memory unit 130 can be any memory in communication with CPU 110 and GPU 120. Memory unit 130 can be volatile memory or non-volatile memory. In an embodiment, memory unit 130 is the physical main memory of a computer system. Examples of volatile memory include a random access memory (RAM). Examples of non-volatile memory include read-only memory, flash memory, ferroelectric RAM (F-RAM), hard disks, floppy disks, magnetic tape, optical discs, etc.

In an embodiment, memory unit 130 stores instructions and data for the CPU 110 and GPU 120 to process. In certain embodiments, programmers or compilers can specify program instructions to execute specifically in CPU 110 or GPU 120. In certain embodiments, CPU 110 can send instructions to GPU 120 for execution and, conversely, GPU 120 can send instructions to CPU 110 for execution. In an embodiment, instructions are Heterogeneous System Architecture (HSA) instructions.

In order to process large amounts of data in parallel, CPU 20 can be configured to execute instructions on a large block of data called a grid. Logic inside GPU 120 can partition a grid into smaller portions, called work-groups, and further can partition work-groups into smaller work-items. GPU 120 then schedules a set of work-items, called a wavefront, to execute in parallel.

This disclosure adopts the terminology of the Open Computing Language (OpenCL) standard for describing the operation and data structures of GPU 120, as described in the previous paragraph. However, those skilled in the art will recognize that this terminology is interchangeable with that of the Compute Unified Device Architecture (CUDA) standard. Under the CUDA standard, a work-group is known as a thread block, a work-item is known as a thread, a wavefront is known as a warp, and Local Data. Share (LDS) is known as Shared Memory. The concepts illustrated by the embodiments described herein with reference to the OpenCL standard are equally applicable to embodiments under the CUDA standard, which are meant to be encompassed by this disclosure. Wherever this disclosure uses OpenCL terminology, the equivalent CUDA terminology is meant to be encompassed. Furthermore, the present disclosure encompasses any embodiments applying standards analogous to OpenCL and CUDA.

Figure 2:
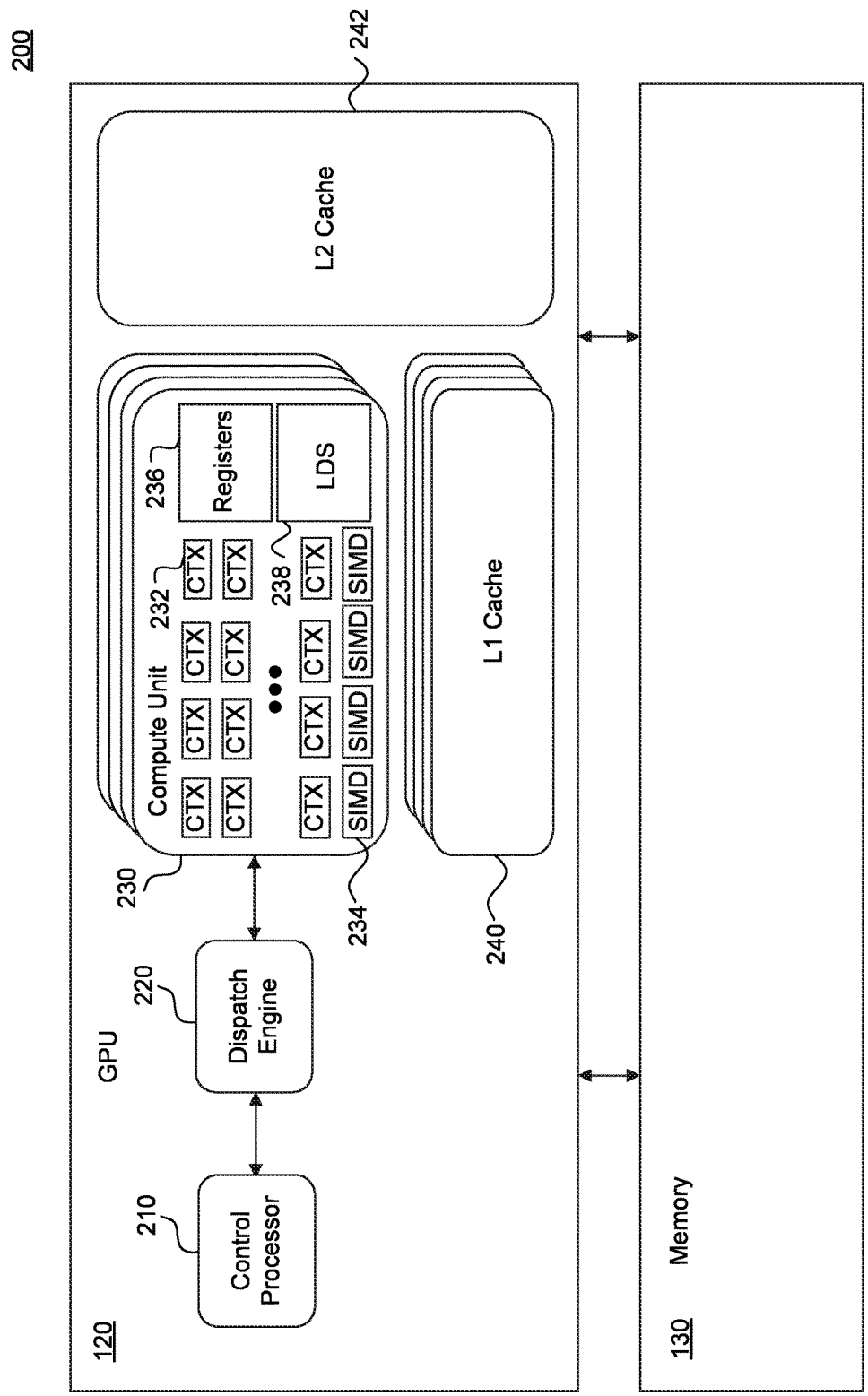
FIG. 2 is a block diagram depicting illustrative relevant portions of a graphics processing unit, according to an embodiment.

FIG. 2 is a block diagram depicting illustrative relevant portions of graphics processing unit 120, according to an embodiment.

GPU 120 contains a control processor 210, a dispatcher 220, a set of compute units 230, a set of L1 caches 240 and a L2 cache 242.

Compute units 230 contain groups of arithmetic logic units (ALUs) that can perform data computations in parallel. This configuration can be beneficial for rapidly and efficiently performing similar computations on a large amount of data. As FIG. 2 illustrates, a compute unit contains a set of context registers (CTX) 232, a set of "single instruction, multiple data" units (SIMD) 234, general purpose registers 236 and a local data share (LDS) memory unit 238.

A CTX 232 contains registers that maintain and control the state of instruction execution by a SIMD 234. For example, a CTX 232 can contain a program counter, an instruction register and other registers storing data to be processed by a SIMD 234.

A SIMD 234 contains multiple ALUs that process the same instructions simultaneously for different data. In an embodiment, a SIMD 234 contains 16 ALUs that process the same instruction for four different sets of data in four clock cycles, for a total of 64 instructions in 4 clock cycles. In an embodiment, this is the finest granularity that a SIMD executes instructions.

A CTX 232 can load data from and store data to registers 236 and LDS 238. Registers 236 can function like general purpose processor registers, and can be used to store data loaded from memory and perform computation on data. LDS 238 can be a very fast memory local to the compute unit 230.

Control processor 210 coordinates and sends data to compute units 230 for processing. In an embodiment, control processor 210 can control which grid, out of several, the GPU should work on. Control processor 210 can indicate to dispatcher 220 which grid the dispatcher should place on the compute units 230.

Once the control processor assigns a grid, dispatcher 220 can schedule and send work-groups from the grid to compute units 230. For example, dispatcher 220 can determine which compute units have enough capacity to handle a particular work-group and load the work-group to execute in an available compute unit.

In an embodiment, dispatcher 220 can be configured to switch executing wavefronts in and out of compute units. By providing a mechanism to context switch wavefronts, an active wavefront can yield hardware resources for another executing wavefront. An executing wavefront is a wavefront that has been partially executed but has not yet finished. An active wavefront is a wavefront that is consuming one of N hardware resources necessary to execute. Under this scheme, M executing wavefronts share N hardware resources, where M>N.

Figure 3A:
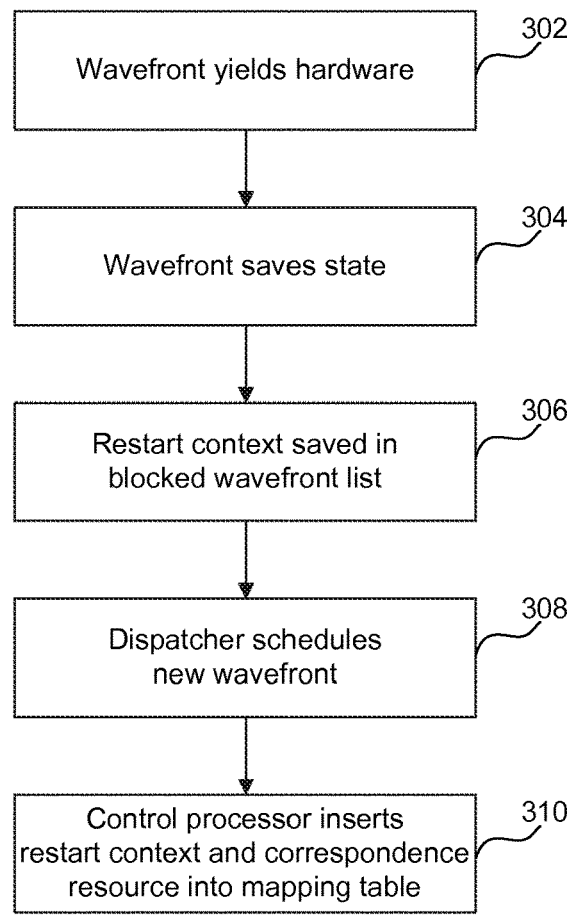
FIG. 3A is a flowchart describing a method for wavefront yields, according to an embodiment.

FIG. 3A is a flowchart describing a method 300 for yielding resources in use by a wavefront, according to an embodiment. As will be appreciated by those skilled in the relevant arts, method 300 may not occur in the order shown or include all the operations shown.

At step 302, a wavefront yields the hardware. As a result, the yielding wavefront stops executing before completion. The yield can occur either voluntarily through an explicit instruction in the wavefront code or the control processor can cause the yield via a preemption mechanism. An explicit instruction to yield can be coded by the programmer or inserted by a compiler of the program code. The yield can be tied to a blocking resource, such that the wavefront will not continue executing until the resource becomes available.

In certain embodiments, a variety of conditions can trigger a wavefront yield. In one example, a wavefront yields when waiting for space in an output buffer. Examples of conditions where a wavefront may need to yield include both software and hardware conditions. Software conditions can be, by way of example: suspension waiting for a flag modification (e.g., on a mwait function, which can block until a synchronization variable is set); a global barrier; critical section management, such as mutexes, semaphores, monitors, etc.; and OS virtualization. Hardware conditions can be, by way of example: waiting on a wavefront scheduling slot within the compute unit, waiting on space in the physical register file or LDS, and adhering to a power budget.

At step 304, the wavefront executes a handler that saves all or part of its state to memory. In an embodiment, the handler uses spill memory allocated for HSA to save the wavefront state. In an embodiment, the program counter and some wavefront registers are saved as part of the wavefront state. For example, the handler can save the wavefront's live registers, predication masks and grid identifiers, etc. In an embodiment, the handler saves all architectural registers of the wavefront. In other embodiments, the programmer specifies or the compiler detects the live register state. In some embodiments, the programmer or the compiler can annotate the kernel with yield points where the live register state has been determined. Yields that occur between these points can be deferred until all work-items in the wavefront reach the point.

In some embodiments, a yield primitive can be specified where no wavefront state is saved. In such embodiments, the yield can serve as a hint to the dispatcher that indicates a scheduling policy that the control processor or dispatcher should follow. For example, a control processor might implement a policy where the oldest wavefront is executed first. Such an oldest-wavefront-first policy could cause deadlocks in certain cases. For example, when an active wavefront cannot proceed until another wavefront reaches a certain point of execution, but this other wavefront is inactive, the work-item might end up deadlocked. A programmer or compiler could detect such scenarios and annotate the wavefront with a yield hint that indicates to the dispatcher that the wavefront should be yielded to another wavefront in the work-group, and thus no state needs to be saved. In other embodiments, software can take advantage of such a yield hint primitive to ensure Quality of Service (QoS) on a GPU, for example, by providing the control processor an indication that a service level agreement (SLA) is not being met.

At step 306, the method stores a restart context necessary to restart the wavefront to a blocked wavefront list. The restart context includes a pointer to the wavefront state stored at step 304 and a resource that the wavefront is blocked on, if any. The blocked wavefront list can be a data structure stored in memory. The data structure can be any data structure that allows an entry to be inserted and removed. For example, the data structure can be a stack, a queue, etc. In an embodiment, the data structure is of a finite size and can be statically allocated.

At step 308, the dispatcher schedules a new wavefront for execution in the released hardware. The dispatcher can retrieve the new wavefront from the blocked wavefront list and schedule it to execute in the released hardware.

At step 310, the control processor retrieves or pops one or more restart contexts from the blocked wavefront list and inserts them into a resource-wavefront mapping table. The mapping table can be a software defined data structure that tracks blocked wavefront and the resources that they are blocked on. The mapping table allows the control processor to locate which wavefronts are waiting for a particular resource to become available. In an embodiment, the software defined data structure is a hash map from resources to blocked wavefronts. In another embodiment, the data structure is a dependency graph of blocked wavefronts. In an embodiment, steps 308 and 310 occur simultaneously.

Figure 3B:
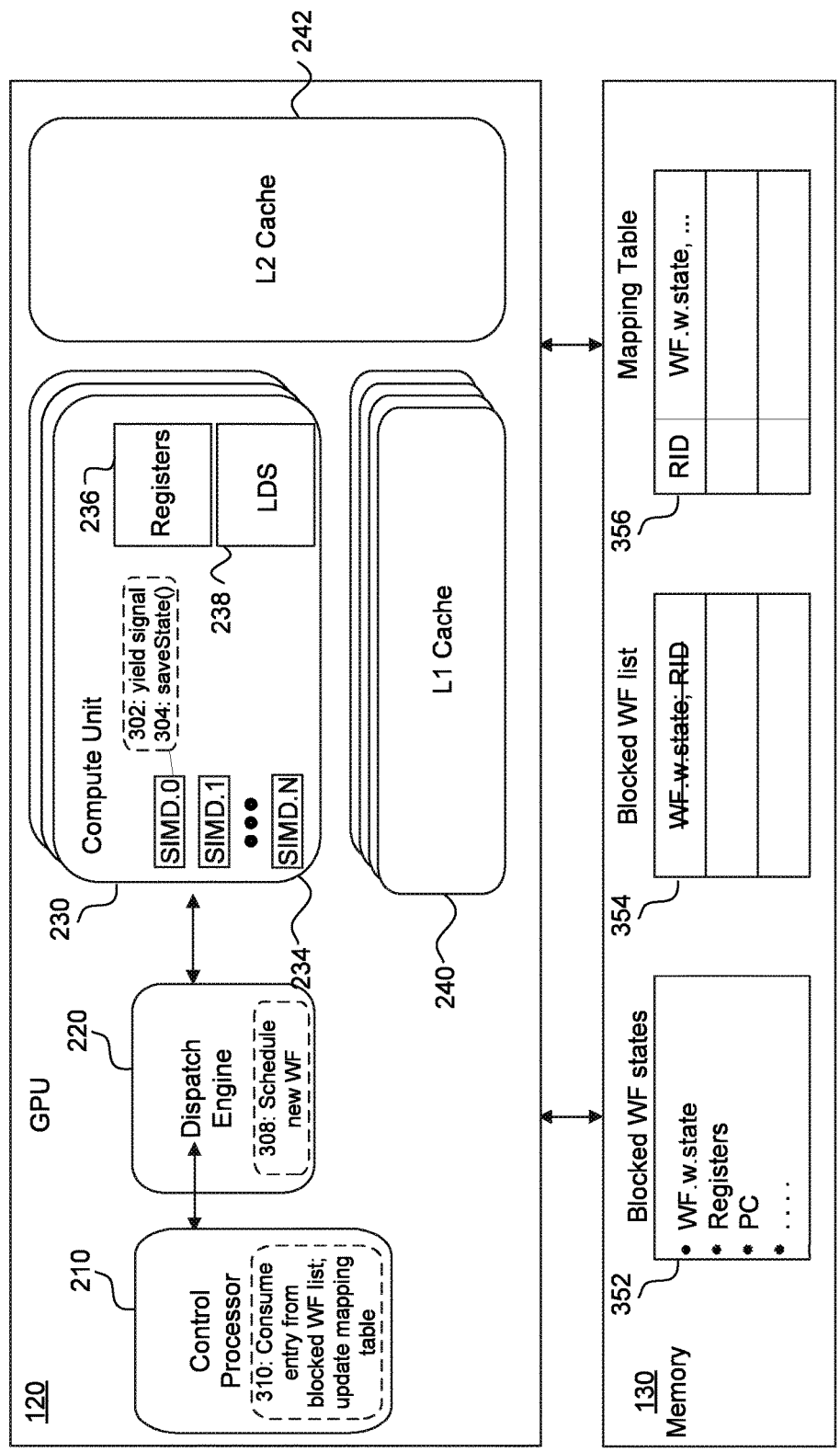
FIG. 3B depicts a block diagram illustrating the steps of a method for wavefront yields as they are performed in the respective portions of an exemplary GPU and memory unit, in an embodiment.

FIG. 3B depicts a block diagram illustrating the steps of method 300 as they are performed in the respective portions of an exemplary GPU and memory unit, in an embodiment.

In an embodiment illustrated in FIG. 3B, memory unit 130 contains a memory region 352 storing the states of blocked wavefronts, a list of blocked wavefronts 354 and a resource-to-wavefronts mapping table 356.

In the embodiment of FIG. 3B, a wavefront executing in SIMD.0 initiates step 302 by executing a yield signal. The wavefront then saves its state to memory region 352 (step 304) and its resource context to blocked wavefront list 354 (step 306).

Once the wavefront releases the hardware, the dispatcher 220 schedules a new wavefront for execution (step 308). The control processor consumes an entry from the blocked wavefront list 354 by retrieving a blocked wavefront's resource context from the list and inserting it into mapping table 356 (step 310).

Figure 4A:
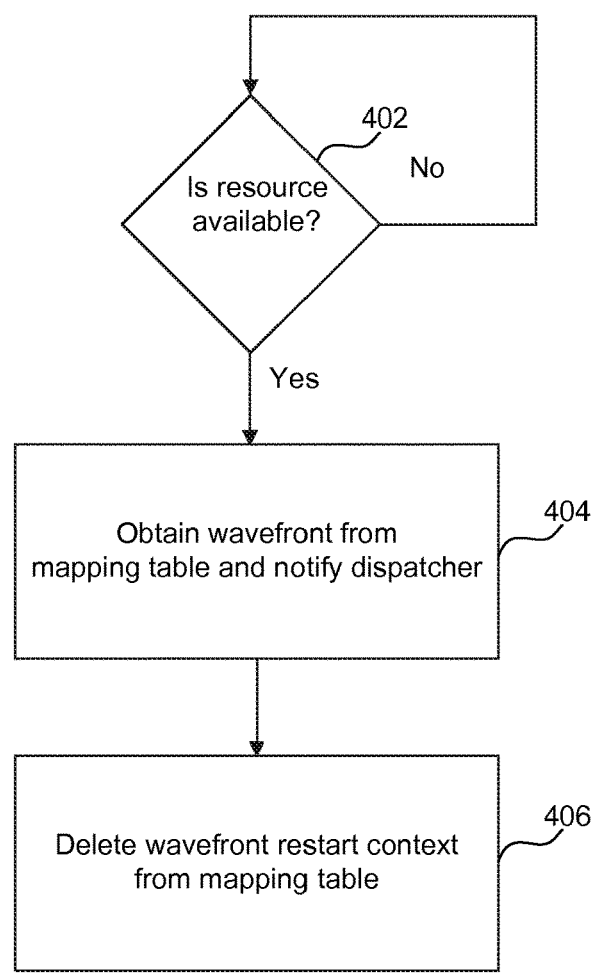
FIG. 4A is a flowchart describing a method for restarting a wavefront that is blocked on a resource, according to an embodiment.

FIG. 4 is a flowchart describing a method 400 for restarting a wavefront that is blocked on a resource, according to an embodiment. As will be appreciated by those skilled in the relevant arts, method 400 may not occur in the order shown or include all the operations shown.

The control processor can monitor resources and wavefronts present in the mapping table. At step 402, the control processor performs this monitoring through, for example, polling or interrupt handlers.

When the control processor detects a resource is available, it obtains a blocked wavefront from the mapping table and notifies the dispatcher that this wavefront can be considered for scheduling again, as described in step 404.

At step 406, the method deletes the wavefront's restart context from the mapping table. The dispatcher can then re-initiate the wavefront when hardware becomes available.

In order to re-initiate a wavefront, the dispatcher loads the saved wavefront state into an available CTX and registers of a compute unit. In an embodiment, the dispatcher must load the re-initiating wavefront in the same compute unit that it was yielded from, in order to prevent having to save the LDS when yielding. In certain embodiments, the control processor does not have to save the LDS because the wavefronts pre-allocate a portion of the LDS prior to initiating execution, and therefore the LDS will not be overwritten by a preempting wavefront. In these embodiments, the wavefronts can only be scheduled from a subset of work-groups whose total LDS allocation does not exceed the amount of on-chip LDS in a compute unit.

Figure 4B:
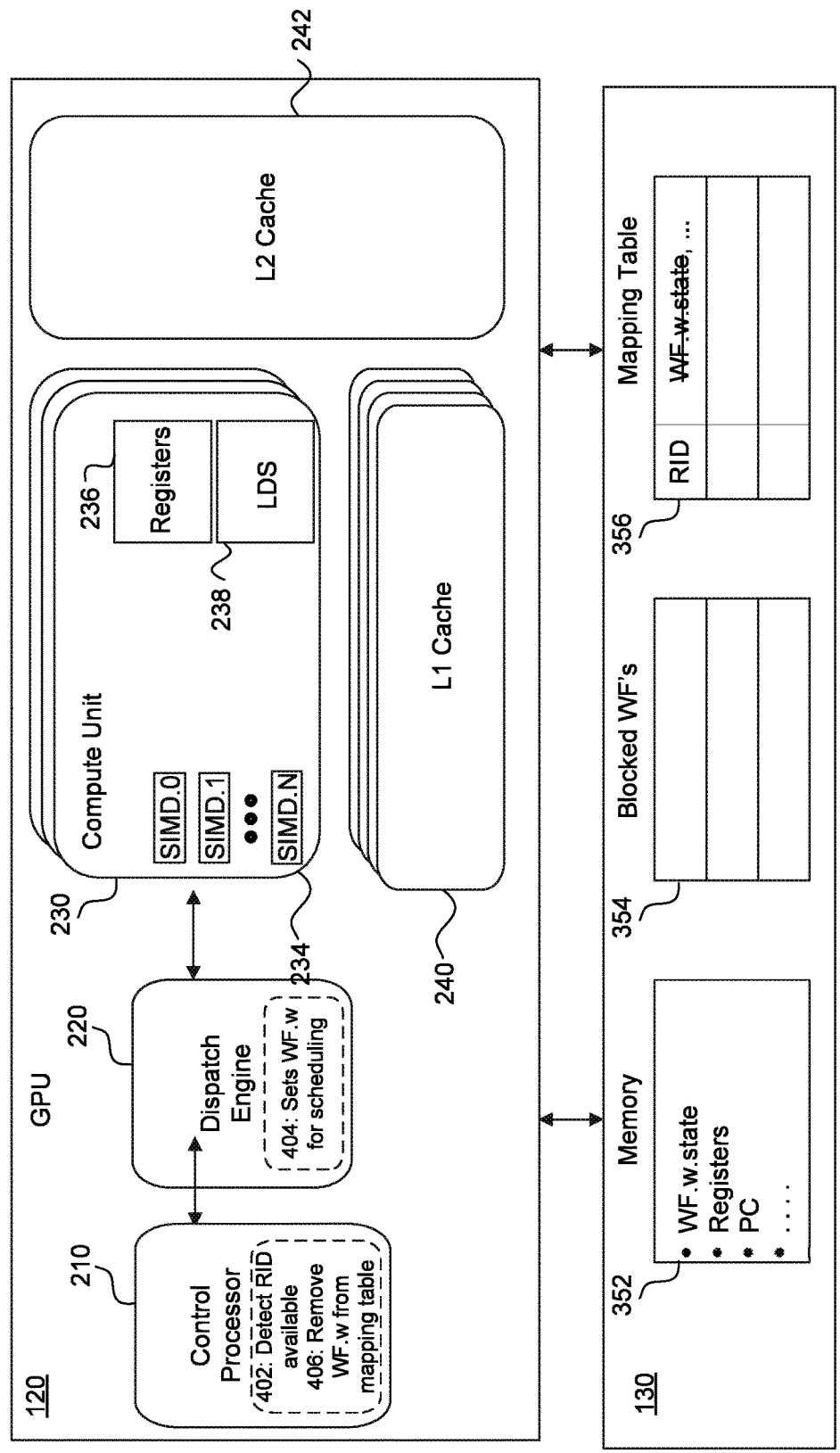
FIG. 4B depicts a block diagram illustrating the steps of a method for restarting a wavefront as they are performed in the respective portions of an exemplary GPU and memory unit, in an embodiment.

FIG. 4B depicts a block diagram illustrating the steps of method 400 as they are performed in the respective portions of an exemplary GPU and memory unit, in an embodiment.

In an embodiment illustrated in FIG. 4B, control processor 210 performs step 402 by monitoring resources to detect when a resource becomes available. When a resource becomes available, the control processor notifies the dispatcher that one or more wavefronts are available for execution by obtaining the corresponding wavefront contexts from mapping table 356 (step 404). The control processor can then remove the wavefront restart context from mapping table 356.

In an embodiment, the programmer or compiler can specify yield sets, which specify a set of work-groups that can be scheduled while there is an outstanding yield. All work-groups within a yield set must consume less LDS memory than the aggregate amount of on-chip LDS. Yield sets can provide a way to virtualize wavefront resources without having to virtualize the LDS memory. In an embodiment, yield sets are defined by wavefronts. For example, yield sets can be extended to support subsets, such as groups of wavefronts that should always be scheduled to the same compute unit. In an embodiment, yield sets can be used to yield at granularities larger than a wavefront such as, for example, a work-group. In an embodiment, a yield set can be used in conjunction with partial barriers to achieve a yield across all wavefronts within the yield set. Any state associated with a yield set, such as the LDS, can be saved to memory so that yield sets can be virtualized onto the hardware.

In an embodiment, a GPU implementing wavefront yielding can support work-group barriers. In an embodiment, the dispatcher knows if a work-group comprises more wavefronts than there are resources for. If there are M executing wavefronts and hardware resources for N active wavefronts, the dispatcher can cause the first M−N resources to yield via, for example, a kernel parameter. In an embodiment, the dispatchers uses a heuristic to preempt wavefronts that may be stuck at a work-group level barrier.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the present embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Figure 5:
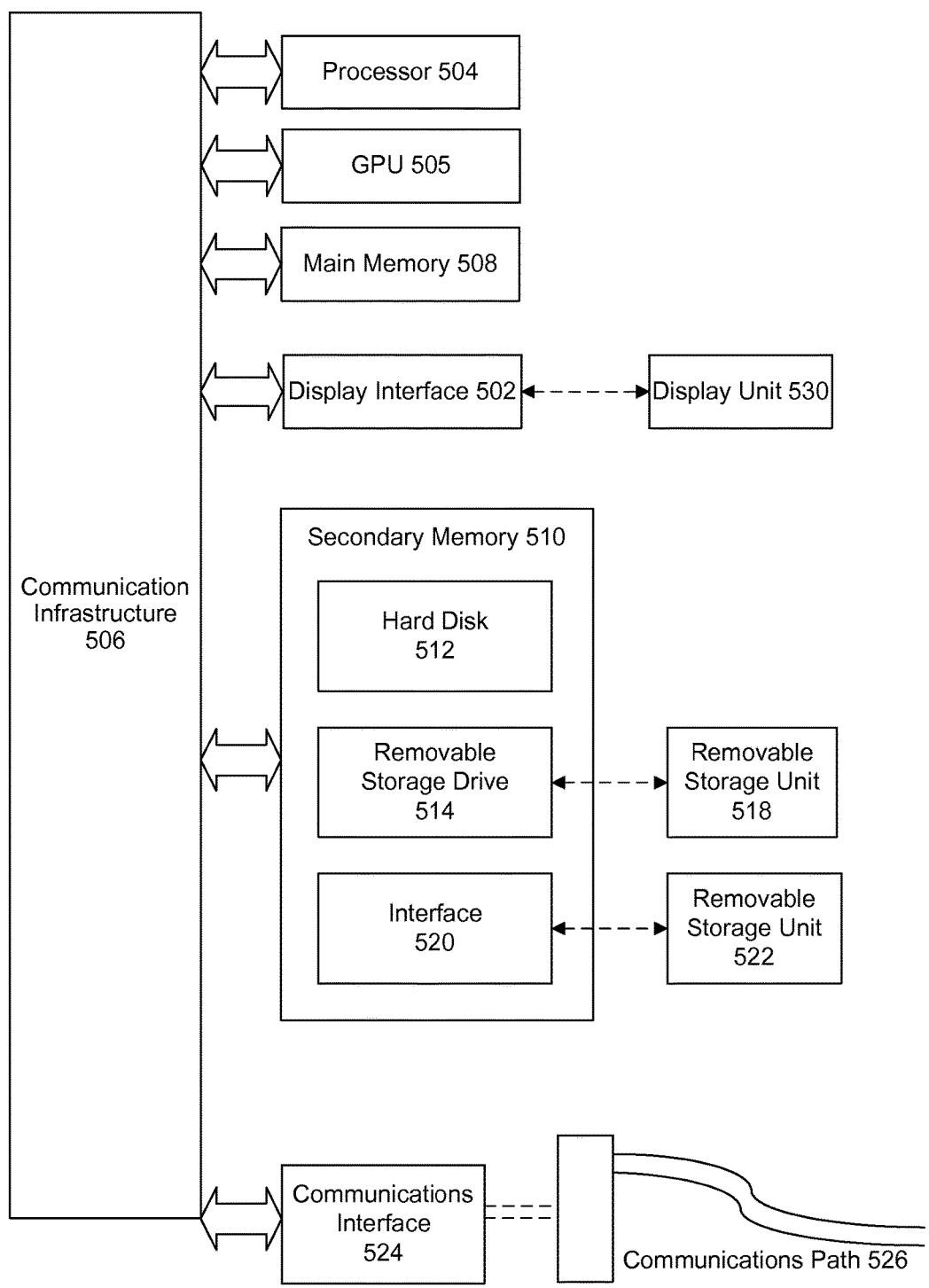
FIG. 5 is an illustration of an example computer system in which embodiments, or portions thereof, can be implemented as computer-readable code.

Various aspects of embodiments of the present embodiments may be implemented in software, firmware, hardware, or a combination thereof. FIG. 5 is an illustration of an example computer system 500 in which embodiments, or portions thereof, can be implemented as computer-readable code. For example, the methods illustrated in the present disclosure can be implemented in portions system 500. Various embodiments are described in terms of this example computer system 500. After reading this description, it become apparent to a person skilled in the relevant art how to implement embodiments using other computer systems and/or computer architectures.

It should be noted that the simulation, synthesis and/or manufacture of various embodiments may be accomplished, in part, through the use of computer readable code, including general programming languages (such as C or C++), hardware description languages (HDL) such as, for example, Verilog HDL, VHDL, Altera HDL (AHDL), other available programming and/or schematic capture tools (such as circuit capture tools), or hardware-level instructions implementing higher-level machine code instructions (e.g., microcode). This computer readable code can be disposed in any known computer-usable medium including a semiconductor, magnetic disk, optical disk (such as CD-ROM, DVD-ROM). As such, the code can be transmitted over communication networks including the Internet. It is understood that the functions accomplished and/or structure provided by the systems and techniques described above can be represented in a core (e.g., a CPU or GPU core) that is embodied in program code and can be transformed to hardware as part of the production of integrated circuits.

Computer system 500 includes one or more processors, such as processor 504 and CPU 505. Processor 504 may be a special purpose or a general-purpose processor and GPU 505 may be a graphics processing unit. For example, in an embodiment, CPU 110 of FIG. 1 may serve the function of processor 504 and GPU 120 may serve the function of CPU 505. Processor 504 and CPU SOS are connected to a communication infrastructure 506 (e.g., a bus or network).

Computer system 500 also includes a main memory 508, preferably random access memory (RAM), and may also include a secondary memory 510. Secondary memory 510 can include, for example, a hard disk drive 512, a removable storage drive 514, and/or a memory stick. Removable storage drive 514 can include a floppy disk drive, a magnetic tape drive, an optical disk drive, a flash memory, or the like. The removable storage drive 514 reads from and/or writes to a removable storage unit 518 in a well-known manner. Removable storage unit 518 can comprise a floppy disk, magnetic tape, optical disk, etc. which is read by and written to by removable storage drive 514. As will be appreciated by persons skilled in the relevant art, removable storage unit 518 includes a computer-usable storage medium having stored therein computer software and/or data.

In alternative implementations, secondary memory 510 can include other similar devices for allowing computer programs or other instructions to be loaded into computer system 500. Such devices can include, for example, a removable storage unit 522 and an interface 520. Examples of such devices can include a program cartridge and cartridge interface (such as those found in video game devices), a removable memory chip (e.g., EPROM or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices. Communications interface 524 can include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and can be implemented using wire or cable, fiber optics, a phone line, a cellular phone link, a RF link or other communications channels.

In this document, the terms "computer program medium" and "computer-usable medium" are used to generally refer to media such as removable storage unit 518, removable storage unit 522, and a hard disk installed in hard disk drive 512. Computer program medium and computer-usable medium can also refer to memories, such as main memory 508 and secondary memory 510, which can be memory semiconductors (e.g., DRAMs, etc.). These computer program products provide software to computer system 500.

Computer programs (also called computer control logic) are stored in main memory 508 and/or secondary memory 510. Computer programs may also be received via communications interface 524. Such computer programs, when executed, enable computer system 500 to implement embodiments as discussed herein. In particular, the computer programs, when executed, enable processor 504 to implement processes of embodiments, such as the steps in the methods illustrated by the flowcharts of the figures discussed above. Accordingly, such computer programs represent controllers of the computer system 500. Where embodiments are implemented using software, the software can be stored in a computer program product and loaded into computer system 500 using removable storage drive 514, interface 520, hard drive 512, or communications interface 524.

Embodiments are also directed to computer program products including software stored on any computer-usable medium. Such software, when executed in one or more data processing device, causes a data processing device(s) to operate as described herein. Embodiments employ any computer-usable or -readable medium, known now or in the future. Examples of computer-usable mediums include, but are not limited to, primary storage devices (e.g., any type of random access memory), secondary storage devices hard drives, floppy disks, CD ROMS, ZIP disks, tapes, magnetic storage devices, optical storage devices, MEMS, nanotechnological storage devices, etc.), and communication mediums (e.g., wired and wireless communications networks, local area networks, wide area networks, intranets, etc.).

What is claimed is:

1. A graphics processing unit (GPU) comprising:
a hardware compute unit configured to execute a first wavefront in a set of single instructions, multiple data (SIMD) units, yield the SIMD units before execution of the first wavefront completes causing a blocked first wavefront, and save information needed to restart the blocked first wavefront in a memory, wherein the saved information tracks the blocked first wavefront and the corresponding set of SIMD units;
a hardware dispatch engine configured to schedule a second wavefront for execution in the set of SIMD units used to execute the blocked first wavefront responsive to the yielding; and
a hardware control processor configured to monitor the saved information and notify the hardware dispatch engine when the set of SIMD units associated with the blocked first wavefront become available;
wherein the hardware compute unit is further configured to execute the second wavefront in the set of SIMD units used to execute the blocked first wavefront and restart execution of the blocked first wavefront when the hardware dispatch engine is notified by the hardware control processor that the set of SIMD units become available after execution of the second wavefront.

2. The GPU of claim 1, wherein the hardware compute unit is further configured to yield the set of SIMD units as a result of a wavefront instruction.

3. The GPU of claim 1, wherein the hardware dispatch engine is further configured to send a signal that causes the hardware compute engine to yield the set of SIMD units.

4. The GPU of claim 1, wherein the saved information is stored in a data structure comprising a hash table.

5. The GPU of claim 1, wherein the hardware compute unit is further configured to provide an indication, and the hardware dispatch engine is further configured select, based on the indication, the second wavefront from a plurality of wavefronts.

6. A method comprising:
executing a first wavefront in a set of single instructions, multiple data (SIMD) units;
stopping execution of a first wavefront before the first wavefront completes causing a blocked first wavefront;
saving information needed to restart the blocked first wavefront in a memory, wherein the saved information tracks the blocked first wavefront and the corresponding set of SIMD units;
scheduling a second wavefront execution in the set of SIMD units used to execute the blocked first wavefront responsive to the stopping;
monitoring the saved information and notifying the hardware dispatch engine when the set of SIMD units associated with the blocked first wavefront become available;
executing the second wavefront in the set of SIMD units used to execute the blocked first wavefront; and
restarting execution of the blocked first wavefront when the hardware dispatch engine is notified by the hardware control processor that the set of SIMD units become available after execution of the second wavefront.

7. The method of claim 6, further comprising stopping execution of the first wavefront as a result of a wavefront instruction.

8. The method of claim 6, further comprising stopping execution of the first wavefront as a result of a preemption signal.

9. The method of claim 6, wherein the saved information is stored in a data structure comprising a hash table.

10. The method of claim 6, further comprising:
providing an indication; and
selecting, based on the indication, the second wavefront from a plurality of wavefronts.

11. A non-statutory computer-readable storage medium having instructions stored thereon, execution of which, by a graphics processing unit (GPU), cause the GPU to perform operations comprising:
executing a first wavefront in a set of single instructions, multiple data (SIMD) units;
stopping execution of a first wavefront before the first wavefront completes causing a blocked first wavefront;
saving information needed to restart the blocked first wavefront in a blocked wavefront list, the information saved in the blocked wavefront list including at least a portion of a state of the blocked first wavefront and a pointer to the saved portion of the state of the blocked first wavefront, wherein the blocked wavefront list is a data structure stored in a memory that tracks the first blocked wavefront and the SIMD units associated with the blocked first wavefront, wherein the data structure has a finite size and is statically allocated;
scheduling a second wavefront execution in the set of SIMD units used to execute the blocked first wavefront;
monitoring the blocked wavefront list, including the information needed to restarted the blocked first wavefront, and notifying the hardware dispatch engine when the SIMD units associated with the blocked first wavefront become available, wherein the hardware control processor retries information from the blocked wavefront list and inserts the information into a mapping table that tracks a blocked wavefront and corresponding SIMD units in order to locate wavefronts waiting for particular SIMD units to become available;
executing the second wavefront in the set of SIMD units used to execute the blocked first wavefront; and restarting execution of the blocked first wavefront when the hardware dispatch engine is notified that the set of SIMD units become available after execution of the second wavefront.

12. The non-statutory computer-readable storage medium of claim 11, further comprising stopping execution of the first wavefront as a result of a wavefront instruction.

13. The non-statutory computer-readable storage medium of claim 11, further comprising stopping execution of the first wavefront as a result of a preemption signal.

14. The non-statutory computer-readable storage medium of claim 11, wherein the data structure comprises a hash table.

15. The non-statutory computer-readable storage medium of claim 11, further comprising:
 providing an indication; and
 selecting, based on the indication, the second wavefront from a plurality of wavefronts.

* * * * *